United States Patent
Wu

(10) Patent No.: US 7,343,182 B2
(45) Date of Patent: Mar. 11, 2008

(54) AUTOMATIC SLIDING MECHANISM

(75) Inventor: Kuo-Hsiang Wu, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 499 days.

(21) Appl. No.: 11/055,656

(22) Filed: Feb. 11, 2005

(65) Prior Publication Data

US 2005/0277449 A1    Dec. 15, 2005

(30) Foreign Application Priority Data

Jun. 11, 2004    (TW) .............................. 93209318 U

(51) Int. Cl.
*H04M 1/00* (2006.01)
*H04M 9/00* (2006.01)

(52) U.S. Cl. .............................. 455/575.4; 455/575.1; 379/433.12

(58) Field of Classification Search ............ 455/575.4, 455/575.1, 90.3, 550.1, 73; 379/433.12, 379/433.01, 433.11

See application file for complete search history.

(56) References Cited

U.S. PATENT DOCUMENTS

| | | | |
|---|---|---|---|
| 5,956,625 A * | 9/1999 | Hansen et al. ............ 455/575.4 |
| 6,643,529 B1 * | 11/2003 | Inoue et al. .............. 455/575.4 |
| 6,785,565 B2 * | 8/2004 | Gventer ................... 455/575.4 |
| 6,842,626 B1 * | 1/2005 | Kubo et al. .............. 455/550.1 |
| 6,950,316 B2 * | 9/2005 | Pan et al. .................... 361/814 |
| 6,950,516 B2 * | 9/2005 | Pirila et al. ............ 379/433.12 |
| 7,136,688 B2 * | 11/2006 | Jung et al. ................ 455/575.4 |
| 7,184,806 B2 * | 2/2007 | Bae .......................... 455/575.4 |
| 2005/0054397 A1 * | 3/2005 | Kim et al. ................ 455/575.4 |
| 2005/0288077 A1 * | 12/2005 | Wu .......................... 455/575.4 |
| 2006/0073858 A1 * | 4/2006 | Nagashima .............. 455/575.4 |
| 2007/0129121 A1 * | 6/2007 | Chambers et al. ....... 455/575.4 |

* cited by examiner

*Primary Examiner*—Sonny Trinh
(74) *Attorney, Agent, or Firm*—Rabin & Berdo, PC

(57) ABSTRACT

An automatic sliding mechanism is described. The automatic sliding mechanism includes a base, a sliding frame, a rail device, an actuating device, a frame recovery device, and a damping device. The rail device couples the sliding frame to the base, and the sliding frame slides along the rail device. The actuating device locks or unlocks the sliding frame in the base. The frame recovery device provides a spring force to move the sliding frame, and the damping device reduces the moving speed of the sliding frame.

12 Claims, 5 Drawing Sheets

AUTOMATIC SLIDING MECHANISM

RELATED APPLICATIONS

The present application is based on, and claims priority from, Taiwan Application Serial Number 93209318, filed Jun. 11, 2004, the disclosure of which is hereby incorporated by reference herein in its entirety.

BACKGROUND OF THE INVENTION

1. Field of Invention

The invention relates to a sliding mechanism and, in particular, to an automatic sliding mechanism for cell phones.

2. Related Art

Due to its convenience of carriage and communication at any time, cell phones have become very popular in daily life. Spurred by progress in science and technology and market competition, the cell phone has more powerful functions than before. For example, aside from the small monochromatic display screen for display text signals, there are also cell phones with large color display screens available for displaying, transmitting and receiving color images. Some of the cell phones with large color display screens on the market are panel-sliding cell phones that use rail devices to couple the display screen panels and the key panel. However, when a user operates such a cell phone, he or she has to manually push the panel to expose the operation keys. In this case, one needs to move fingers or use the other hand to slide the panel. Moreover, the panel has to slide all the way out before the operation, causing inconvenience. As the space inside the cell phone is very limited, wiggling often happens if the fixed part and the sliding part of the panel-sliding cell phone are coupled in a small region.

SUMMARY OF THE INVENTION

An objective of the invention is to provide an automatic sliding mechanism. Using a cell phone with the disclosed automatic sliding mechanism, the user can easily open the sliding part without changing the gesture of holding the phone. This is because one only needs to press an actual release button provided on one side of the fixed part of the cell phone. The sliding part automatically slides open.

Another objective of the invention is to provide an automatic sliding mechanism that solves the wiggling problem and improves the stability of the automatic sliding mechanism by elongating the fixed rail and the rail device.

A further objective of the invention is to provide an automatic sliding mechanism that uses double actuating devices for operations. This can effectively avoid the opening of the sliding part by accidentally touching the actual release button when placing the cell phone in a bag or pocket.

To achieve the above objectives, the disclosed automatic sliding mechanism contains a base, a sliding frame, a rail device, an actuating device, a frame recovery device, and a damping device. The base is installed on the fixed part of a cell phone and, in contrast, the sliding frame is installed on the sliding part of the cell phone. The rail device is provided between the base and the sliding frame, including a fixed rail and a sliding rail. The fixed rail is formed on both sides of the base, and the sliding rail is formed on both sides of the sliding frame. The fixed rail and the sliding rail are coupled so that the sliding rail slides along the fixed rail. The coupling range is extended to solve the wiggling problem and enhance the system stability. The actuating device is installed on both sides of the base, close to the rail device. It includes a left actuating device and a right actuating device. Each of the left actuating device and the right actuating device contains a latch slot, a latch, a latch recovery device, a lock hole, and an indirect release button. The latch slot is formed on the base and contains the latch. The latch recovery device pushes the front end of the latch toward the rail device, locking onto the lock holes on both sides of the sliding frame in order to fix the closed sliding frame. The indirect release button is installed inside the lock hole to receive the pressure from pressing the actual release button and to push the latches away from the lock holes. The sliding frame is thus released. Due to the frame recovery device installed between the fixed rail and the sliding rail, the sliding frame starts to slide. The damping device is installed between the sliding rail and the fixed part of the cell phone. It contains a damping gear and a damping gear rail to reduce the moving speed of the sliding frame so that it is not abruptly pushed out due to the elasticity of the frame recovery device. The sliding frame then slowly slides out.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE PREFERRED EMBODIMENT

Figure 1:
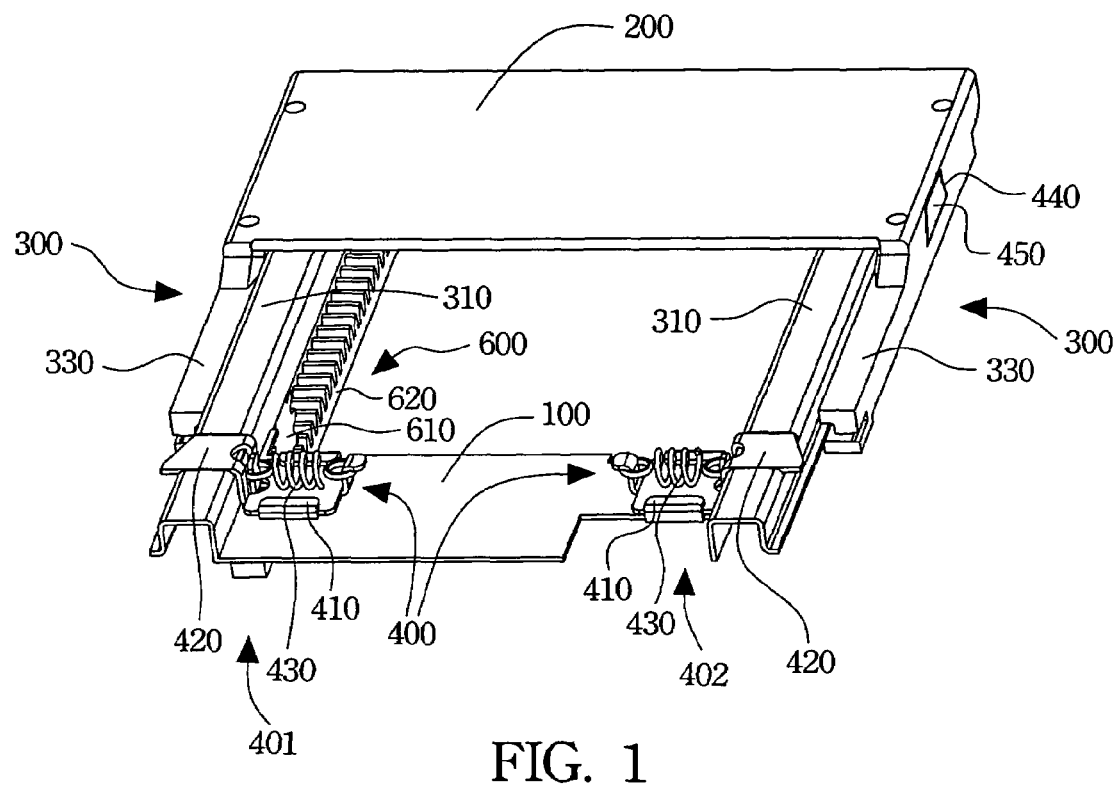
FIG. 1 is a three-dimensional view of unlocking the sliding frame of the disclosed automatic sliding mechanism.
Figure 2:
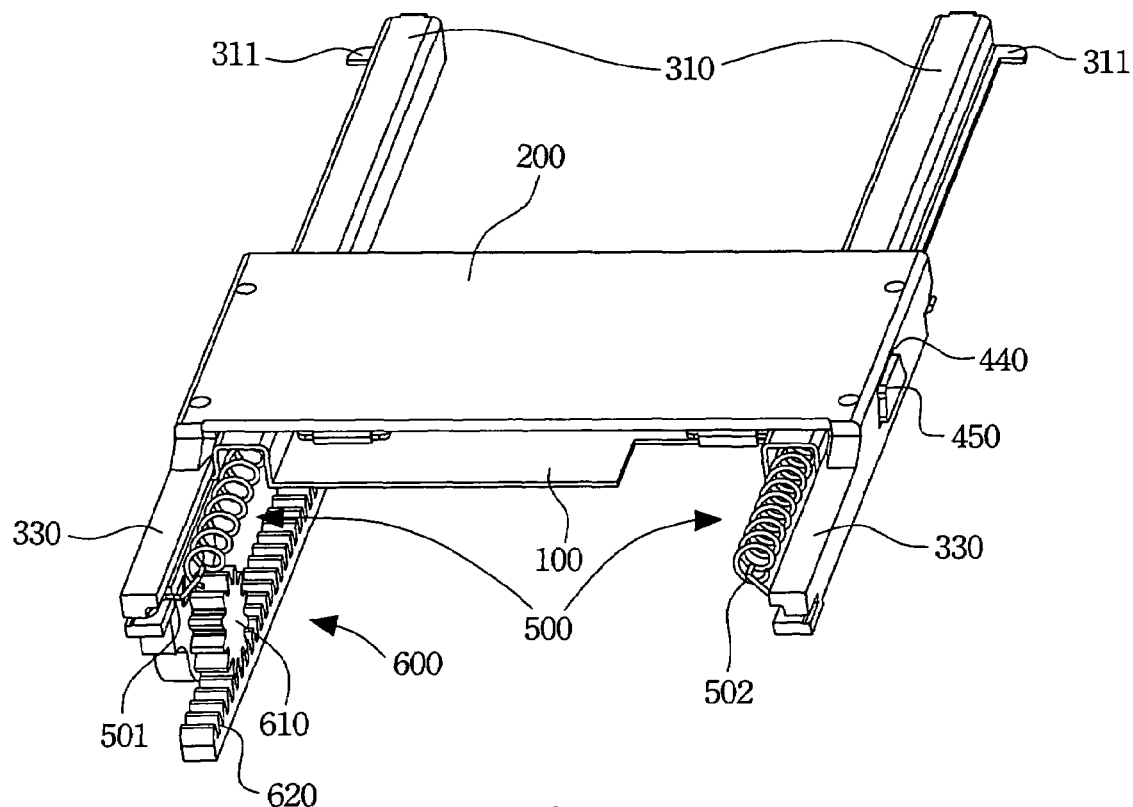
FIG. 2 is a three-dimensional view of locking the sliding frame of the disclosed automatic sliding mechanism.

As shown in FIGS. 1 and 2, the disclosed automatic sliding mechanism contains a base 100, a sliding frame 200, a rail device 300, an actuating device, a frame recovery device 500, and a damping device 600. The sliding frame 200 is coupled to the base 100 by the rail device 300. With reference to FIGS. 5A, 5B, 6A, and 6B, the base 100 can be installed at the fixed part 710 of a cell phone 700. The sliding frame 200 is correspondingly installed at the sliding part 720 of the cell phone 700.

The rail device 300 is installed between the base 100 and the sliding frame 200. It contains a fixed rail 310 and a sliding rail 330. The fixed rail 310 is formed on both sides of the base 100, and the sliding rail 330 on both sides of the sliding frame 200. The fixed rail 310 and the sliding rail 330 are coupled so that the sliding rail 330 can slide along the fixed rail 310. The coupling range of the fixed rail 310 and the sliding rail 330 is not limited to the side length of the sliding frame 200 but longer. This longer coupling range solves the wiggling problem and enhances the stability of the invention. One end of the fixed rail 310 is further provided with a stop wedge 311 to limit the sliding range of the sliding rail 330. The sliding rail 330 is thus prevented from leaving the fixed rail 310.

The actuating device 400 is a dual actuating device installed on both sides of the base 100 close to the rail device 300. It includes a left actuating device 401 and a right actuating device 402. Each of the left actuating device 401 and the right actuating device 402 contains a latch slot 410, a latch 420, a latch recovery device 430, a lock hole 440, and an indirect release button 450. The latch slot 410 is formed on the base 100. The latch 420 is installed inside the latch slot 410 and can move along the latch slot 410. Using the latch recovery device 430 installed between the latch 420 and the base 100, the front end of the latch 420 is pushed toward the rail device 300. The latch recovery device 430 such as a spring provides an elastic force to push the front end of the latch 420 toward the rail device 300. Since the latch recovery device 430 is hooked between the latch 420 and the base 100, it has the function of preventing the latch 420 from sliding out of the latch slot 410. The lock holes 440 are provided on both sides of the sliding frame 200 to slide along with the sliding frame 200. When the lock holes 440 slide by the sides of the latches 420, the latches 420 move into the lock holes 440 to lock the sliding frame 200. The lock hole 440 further contains an indirect release button 450 to receive the pressure from pressing an actual release button 730. It pushes the latches 420 away from the lock holes 440, unlocking the sliding frame 200.

The frame recovery device 500 is installed between the fixed rail 310 and the sliding rail 330, containing a left frame recovery device 501 and a right frame recovery device 502. The frame recovery device 500, such as a spring, provides an elastic force for enabling the sliding frame to slide. When the sliding frame 200 unlocks, the frame recovery device 500 in the extension state draws the sliding rail 330 to slide on the fixed rail 310, moving the sliding frame 200 toward the end installed with a stop wedge 311 and opening the sliding part 720 of the cell phone. Since the frame recovery device 500 is hooked between the fixed rail 310 and the sliding rail 330, therefore, it has the function of preventing the sliding rail 330 from sliding out of the fixed rail 310.

The damping device 600 is installed between the sliding rail 330 and the fixed part of the cell phone 710. It contains a damping gear 610 and a damping gear rail 620. The damping gear is provided on the sliding rail 330. The damping gear rail 620 is installed at a position on the fixed part 710 of the cell phone to couple with the damping gear 610. The damping gear 610 rotates along the damping gear rail 620 to produce the damping effect. The damping device 600 also contains a damping ointment, coated between the damping gear 610 and the damping gear rail 620 and on the axis of the damping gear 610. The damping effect can be varied by adjusting the viscosity of the damping ointment in order to change the sliding speed of the sliding frame 200 after unlocking. Therefore, the sliding frame 200 does not abruptly spring out because of the elasticity of the frame recovery device 500. The damping device 600 has the effect of making the sliding frame 200 slide smoothly. This can avoid the vibrations that may shorten the cell phone lifetime if the sliding frame 200 abruptly eject out.

Figure 3A:
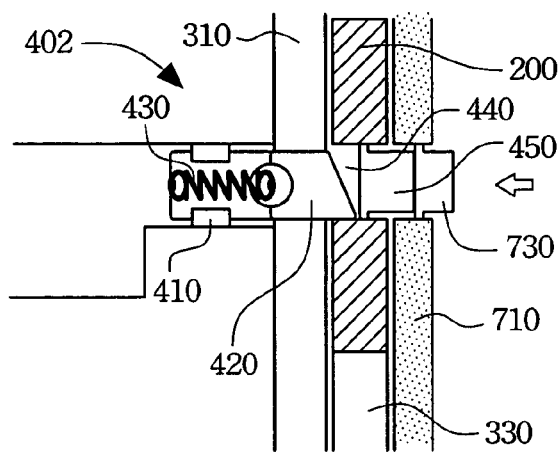
FIGS. 3A to 3C show how the right actuating device unlocks the sliding frame for it to slide.
Figure 3B:
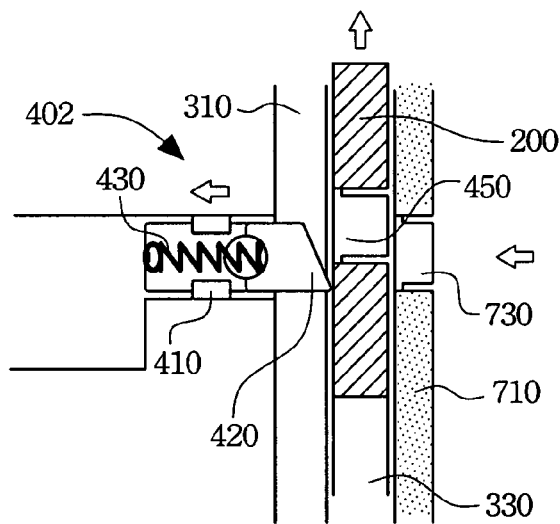
Figure 3C:
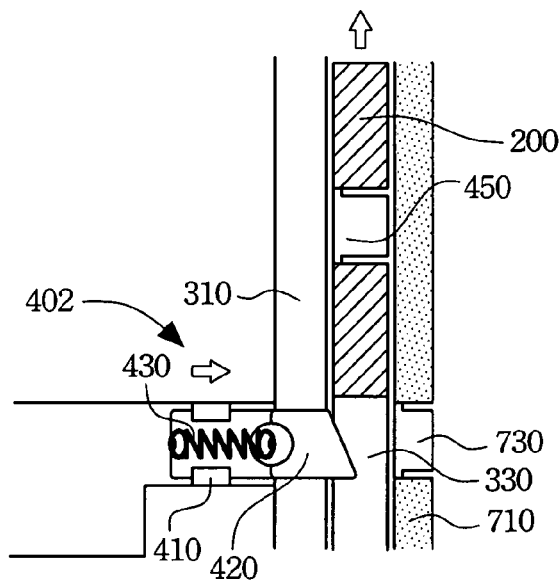

FIGS. 3A to 3C show how the right actuating device unlocks the sliding frame for it to slide. As shown in the drawing, when unlocking the sliding frame 200, a pressure is imposed on the actual release button 730. The indirect release button 450 receives the pressure and pushes the latch 420 in. When the latch 420 leaves the lock hole 440 under the force of the indirect release button 450, the extended frame recovery device 500 drags the sliding rail 330 to slide on the fixed rail 310. The sliding frame 200 moves toward the stop wedge 311, thereby making the sliding part 720 of the cell phone slide open. Once the sliding frame 200 touches the stop wedge 311, it stops sliding and finishes its extension.

Although we only use the right actuating device 402 to explain how to unlock the sliding frame 200 in FIGS. 3A to 3C, the same is true for the left actuating device 401 too. However, the left actuating device 401 and the right actuating device 402 are independent devices without any connection. Therefore, one has to operate on both the left actuating device 401 and the right actuating device 402 separately in order to unlock the sliding frame 200. If only one of the left actuating device 401 and the right actuating device 402 is released, the sliding frame 200 cannot slide because the other one is still locked. This can avoid the opening of the sliding part 720 by accidentally touching the actual release button 730 when placing the cell phone in a bag or pocket. The invention employs double actuating devices 400 for the unlocking of the sliding frame 200.

Figure 4A:
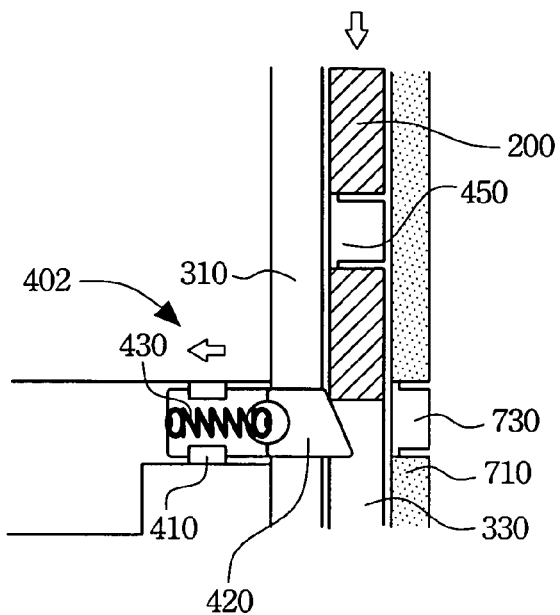
FIGS. 4A to 4C show how the sliding frame is locked by the right actuating device.
Figure 4B:
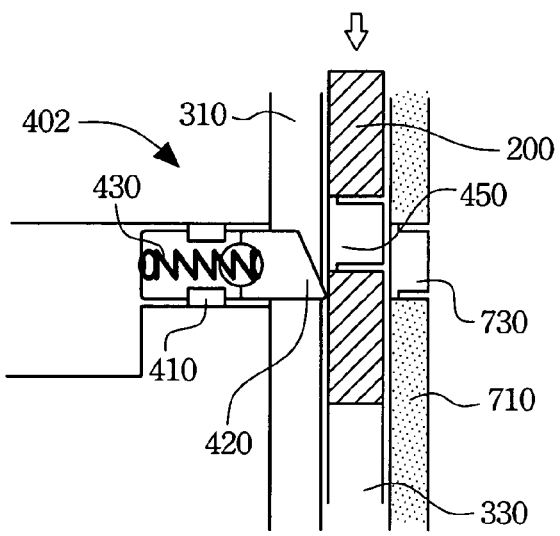
Figure 4C:
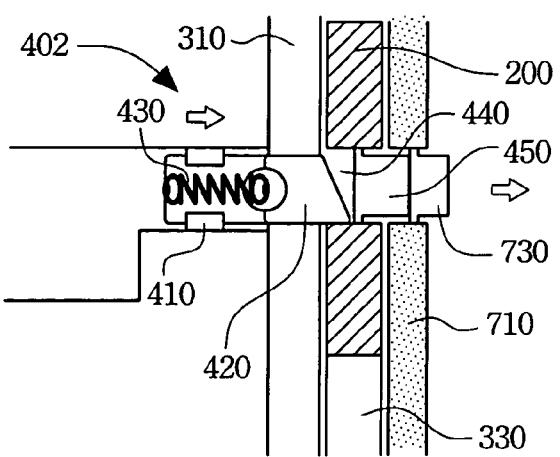
Figure 5A:
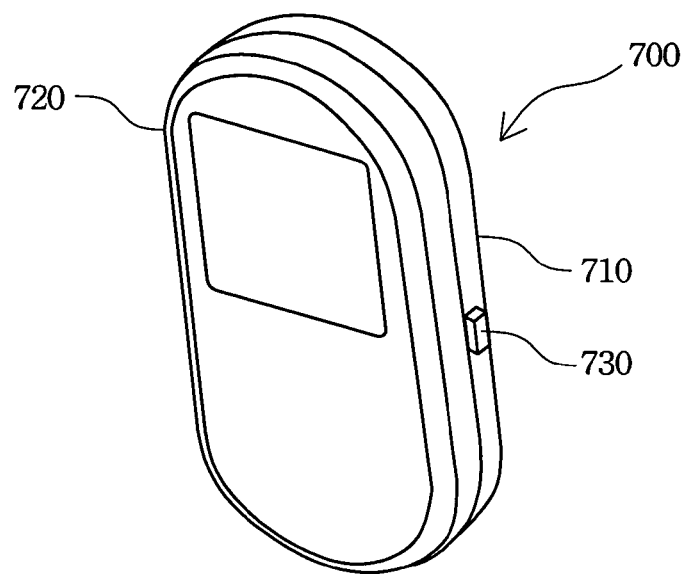
FIGS. 5A and 5B show respectively the closed and open display screen panel in an embodiment of the invention where the disclosed automatic sliding mechanism is installed on a cell phone with an upward sliding display screen panel.
Figure 5B:
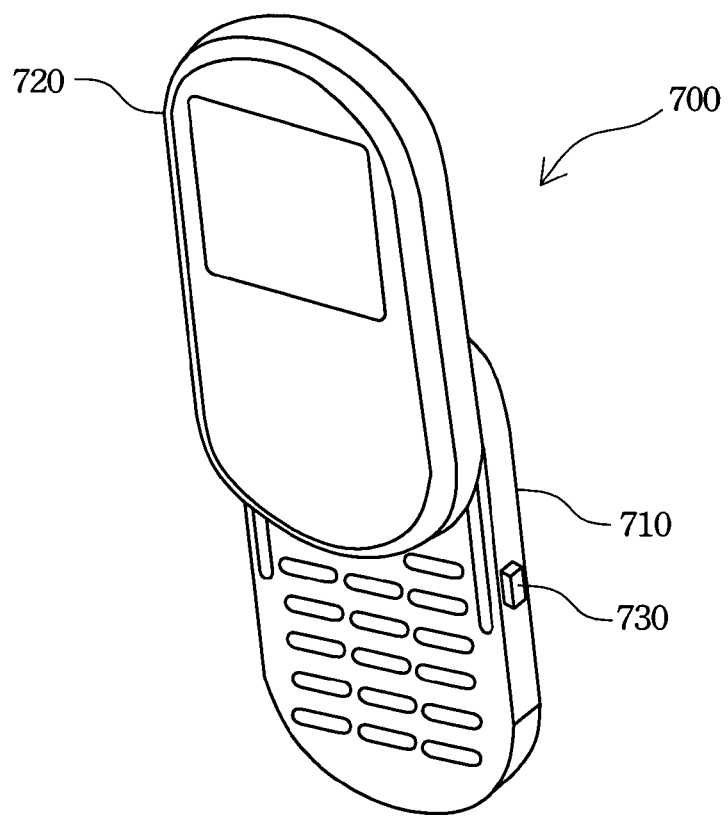
Figure 6A:
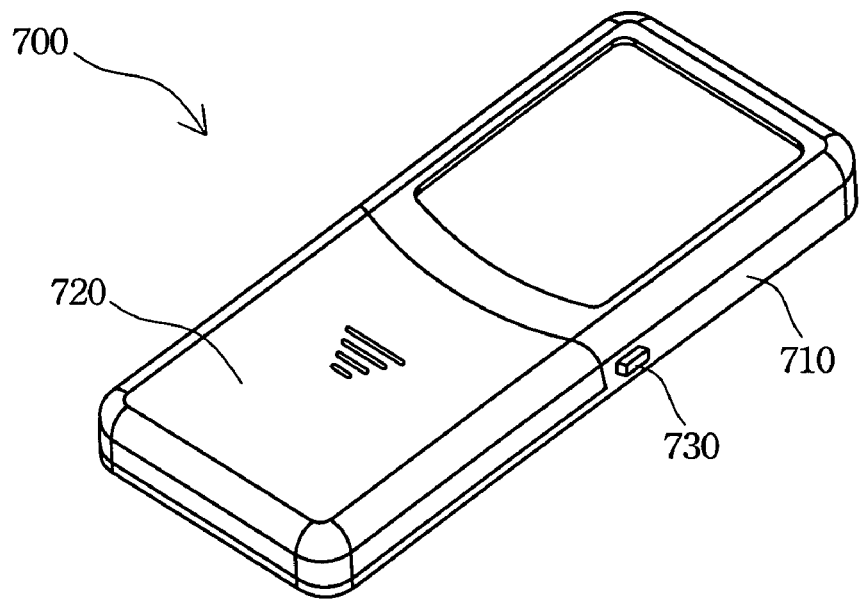
FIGS. 6A and 6B show respectively the closed and open display screen panel in another embodiment of the invention where the disclosed automatic sliding mechanism is installed on a cell phone with a downward sliding keypad cover panel.
Figure 6B:
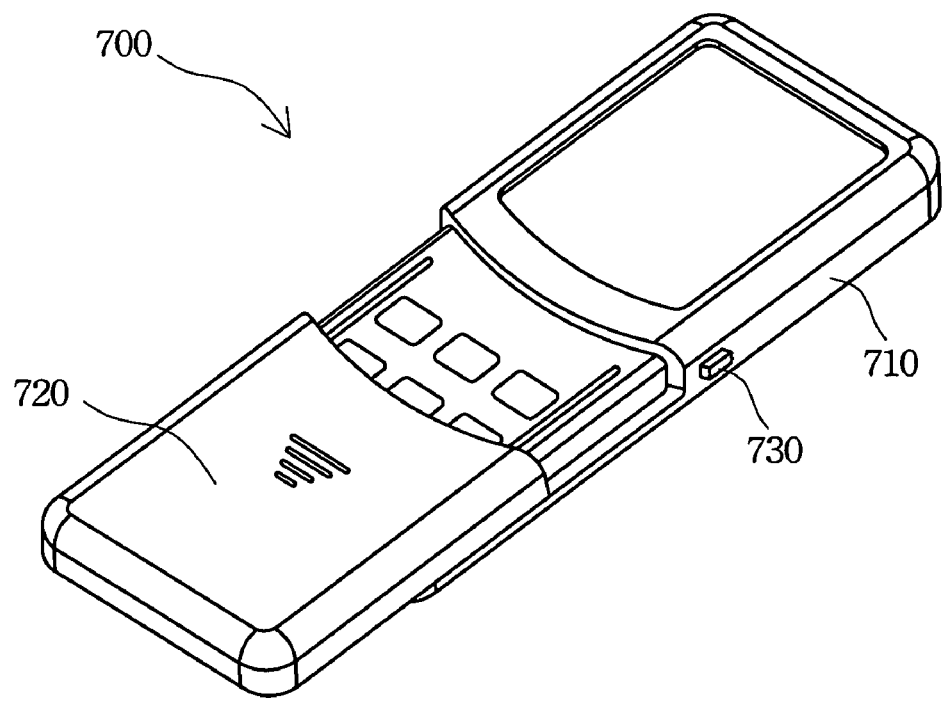

FIGS. 4A to 4C show how the sliding frame is locked by the right actuating device. As shown in the drawing, to lock the sliding frame 200 with the latch 420, one pushes the sliding part 720 so that the sliding frame 200 is brought to slide toward the latch 420 along the rail device 300. At the same time, a stress force is imposed on the frame recovery device 500 for it to stretch. Energy is stored in the potential for the next release of the sliding frame 200. When the bottom of the sliding frame 200 touches the slant surface of the latch 420, the sliding frame 200 pushes the latch 420 into the latch slot 410. The latch 420 imposes a force on the latch recovery device 430 to deform it. Energy is stored in the latch recovery device 430. When the sliding frame 200 is pushed further along the direction, the front end of the latch 420 tightly touches against the inner side of the sliding frame 200. Once the sliding frame 200 is pushed so that the lock hole 440 moves by the latch 420, the front end of the latch 420 experience no resistance so that the latch recovery device 430 transforms the stored energy into a force to push the latch 420 into the lock hole 440. The indirect release button 450 is simultaneously pushed by the latch 420 to protrude from the outer side of the sliding frame 200. The actual release button 730 is also pushed for the next unlocking of the sliding frame 200. This completes the locking of the sliding frame 200.

Although we use the right actuating device 402 to explain the locking of the sliding frame 200 and the latch 420 in FIGS. 4A to 4C, the same is true for the left actuating device 401. However, the left actuating device 401 and the right actuating device 402 are independent devices without any connection. Therefore, the sliding frame 200 is locked as long as one of the left actuating device 401 and the right actuating device 402 is locked. Since the fixed rail 310 and the sliding rail 330 have a stable coupling, the lock holes 440 on both sides of the sliding frame 200 move in parallel as the sliding frame slide. Thus, the latches 420 of the left actuating device 401 and the right actuating device 402 can simultaneously lock into the lock holes 440, stabilizing the sliding frame in its lock position.

The disclosed technique can be implemented in various ways. For example, the sliding direction of the sliding frame 200 is not limited to the upward one in the above embodiment. As shown in FIGS. 5A and 5B, and 6A and 6B, the invention can be used in the cell phone whose display screen panel slides upward and whose keypad cover panel slides downward, respectively. Based upon the spirit disclosed herein, the invention can be used in devices with arbitrary sliding directions.

The shapes of various components in the invention are not limited to the ones shown in the drawings. The components with any shapes can be used as long as they have the functions described in the specification. Such modifications should be considered as part of the invention.

From the preferred embodiment disclosed above, the invention is seen to have the following advantages:

1. The user can operate the actual release buttons provided by the fixed part of the cell phone without changing the gesture of holding the cell phone. The sliding part automatically slides open.

2. By elongating the coupling range between the fixed rail and the sliding rail, the wiggling problem is solved and the automatic sliding mechanism becomes more stable.

3. The invention utilizes two actuating devices to avoid the opening of the sliding part by accidentally touching the actual release button when placing the cell phone in a bag or pocket.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An automatic sliding mechanism, comprising:
a base, which is installed on a fixed part of a device;
a sliding frame, which is installed on a sliding part of the device;
a rail device, which is installed between the base and the sliding frame for the sliding frame to slide along the rail device, the rail device further comprising:
a fixed rail, which is formed on both sides of the base; and;
a sliding rail, which is formed on both sides of the sliding frame,
wherein the fixed rail and the sliding frame are coupled so that the sliding frame slides along the rail device, and a long coupling range is used to prevent wiggling and enhance its stability;
an actuating device, which is installed on the base close to the rail device for locking and unlocking the sliding frame; and
a damping device installed between the sliding rail and the fixed part of the device, the damping device further comprising:
a damping gear; and
a damping gear rail, which is coupled with the damping gear,
wherein when the sliding rail slides along the fixed rail, the damping gear rotates along the damping gear rail to reduce the sliding speed of the sliding frame.

2. The automatic sliding mechanism of claim 1, wherein the rail device contains a stop wedge formed on one end of the fixed rail to limit the sliding range of the sliding rail and to prevent the sliding rail from leaving the fixed rail.

3. The automatic sliding mechanism of claim 1, further comprising a frame recovery device, which is installed between the fixed rail and the sliding rail to provide an elastic force for enabling the sliding frame to slide and preventing the sliding rail from leaving the fixed rail.

4. The automatic sliding mechanism of claim 1, wherein the damping device further comprises a damping ointment coated between the damping gear and the damping gear rail and on the axis of the damping gear, adjusting the damping effect.

5. An automatic sliding mechanism, comprising:
a base, which is installed on a fixed part of a device;
a sliding frame, which is installed on a sliding part of the device;
a rail device, which is installed between the base and the sliding frame for the sliding frame to slide along the rail device; and
an actuating device, which is installed on the base close to the rail device for locking and unlocking the sliding frame,
wherein the actuating device is a double actuating device comprising a left actuating device and a right actuating device, and each of the left actuating device and the right actuating device further comprises
a latch slot, which is installed on the base close to the rail device;
a latch, which is installed inside the latch slot and limited to move along the latch slot for locking the sliding frame;
a lock hole, which is formed on the side of the sliding frame for the latch to lock in;
a latch recovery device, which is installed between the latch and the base for providing an elastic force to push the front end of the latch toward the rail device and to prevent the latch from leaving the latch hole; and
an indirect release button, which is provided inside the lock hole for receiving an external operating pressure, pushing the latch away from the lock hole, and thus unlocking the sliding frame.

6. An automatic sliding mechanism, comprising:
a base, which is installed on a fixed part of a device;
a sliding frame, which is installed on a sliding part of the device;
a rail device, which is installed between the base and the sliding frame for the sliding frame to slide along the rail device, the rail device further comprising:
a fixed rail, which is formed on both sides of the base; and
a sliding rail, which is formed on both sides of the sliding frame;
wherein the fixed rail and the sliding frame are coupled so that the sliding frame slide along the rail device, and a long coupling range is used to prevent wiggling and enhance its stability;
an actuating device, which is installed on the base close to the rail device for locking and unlocking the sliding frame; wherein the actuating device is a double actuating device comprising a left actuating device and a right actuating device comprising a left actuating device and a right actuating device, wherein each of the left actuating device and the right actuating device further comprises:
a latch slot, which is installed on the base close to the rail device;
a latch, which is installed inside the latch slot and limited to move along the latch slot for locking the sliding frame;
a lock hole, which is formed on the side of the sliding frame for the latch to lock in;
a latch recovery device, which is installed between the latch and the base for providing an elastic force to push the front end of the latch toward the rail device and to prevent the latch from leaving the latch hole; and an indirect release button, which is provided inside the lock hole for receiving an external operating pressure, pushing the latch away from the lock hole, and thus unlocking the sliding frame.

7. The automatic sliding mechanism of claim 6, wherein the rail device comprises a stop wedge formed on one end of the fixed rail to limit the sliding range of the sliding rail and to prevent the sliding rail from leaving the fixed rail.

8. The automatic sliding mechanism of claim 6 further comprising a frame recovery device, which is installed between the fixed rail and the sliding rail to provide an elastic force for enabling the sliding frame to slide and preventing the sliding rail from leaving the fixed rail.

9. The automatic sliding mechanism of claim 6 further comprising a damping device installed between the sliding rail and the fixed part of the device, the damping device comprising:

a damping gear; and a damping gear rail, which is coupled with the damping gear;

wherein when the sliding rail slides along the fixed rail, the damping gear rotates along the damping gear rail to reduce the sliding speed of the sliding frame.

10. The automatic sliding mechanism of claim 9, wherein the damping gear is installed on the sliding part of the device and the damping gear rail is installed correspondingly on the fixed part of the device.

11. The automatic sliding mechanism of claim 9, wherein the damping gear is installed on the fixed part of the device and the damping gear rail is installed correspondingly on the sliding part of the device.

12. The automatic sliding mechanism of claim 9, wherein the damping device further comprises a damping ointment coated between the damping gear and the damping gear rail and on the axis of the damping gear, adjusting the damping effect.

\* \* \* \* \*